Feb. 3, 1959
J. S. NORMAND
2,871,948
PROCESS OF TREATING OIL AND GAS
WELLS TO INCREASE PRODUCTION
Filed June 23, 1955
2 Sheets-Sheet 1
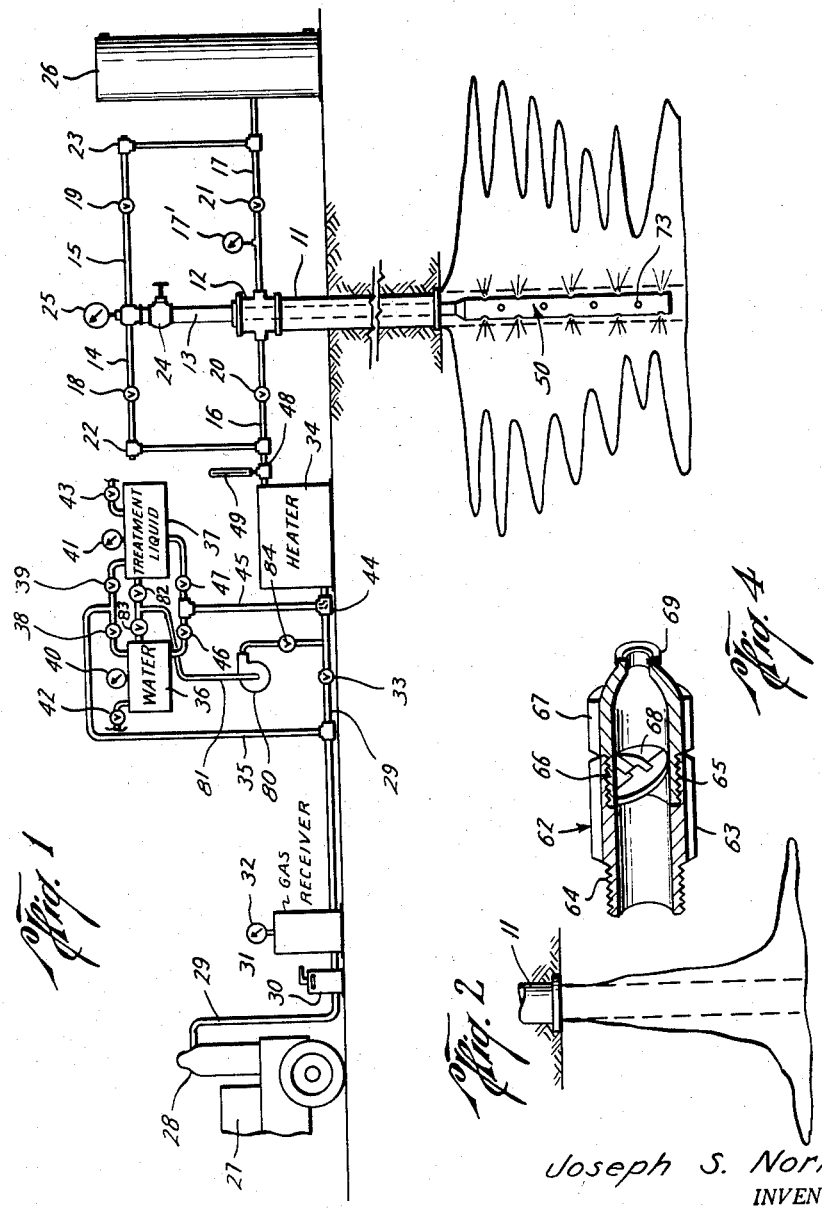
Joseph S. Normand
INVENTOR.
BY Wm. E. Ford
ATTORNEY

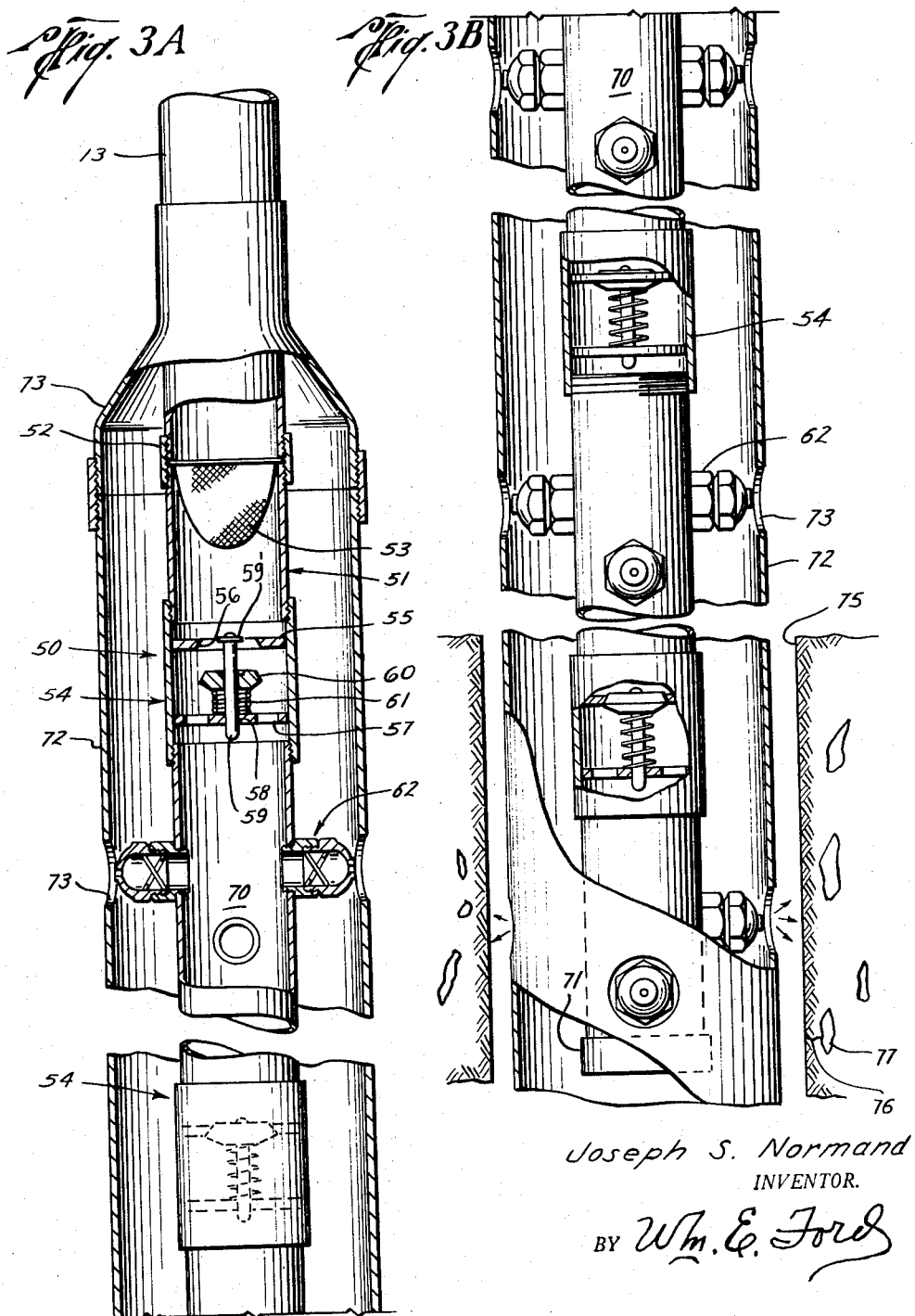

United States Patent Office 2,871,948
Patented Feb. 3, 1959

2,871,948

PROCESS OF TREATING OIL AND GAS WELLS TO INCREASE PRODUCTION

Joseph S. Normand, Fort Worth, Tex., assignor to Normand Chemical Process Corporation, Houston, Tex., a corporation of Texas Application June 23, 1955, Serial No. 517,487

11 Claims. (Cl. 166—222)

This invention relates to the treatment of oil and gas wells, and more particularly to an improved method of facilitating and augmenting the flow of such wells by removing obstructions to flow existing in the producing formation adjacent the well bore, whether such obstructions are inherent in the producing formation or have accumulated during a period of operation of the well, and by increasing the porosity and permeability of the producing formation.

It is well known that the rate of flow of oil and gas wells gradually declines in time, and that the cause of such lessening of flow is that the pores and interstices of the producing formation adjacent the bottom of the well bore become clogged by paraffin, asphalt, earth particles and other sediment. It is also well known that some new wells that have been drilled into a producing formation of fine-grained rock such as dolomite, or certain hard limestones, are initially either unable to produce at all or unable to produce satisfactorily, and it has become a general practice in order to "bring in" such new wells and to increase the flow from old wells, to "acidize" the well, that is, to introduce into the well a charge of an aqueous acid solution capable of attacking the material of the formation by reacting with various constituents thereof, particularly the carbonates, of which many lime formations are almost entirely constituted, and of which a large percentage is found in nearly all of the sand formations. After the aqueous acid solution has been dumped into the well, it has been the general practice to apply thereto a pressure, by a liquid "load" or a gas "load," sufficient to force it laterally as far as possible into the producing formation.

Various acids are used for this purpose, particularly hydrochloric acid in the form of commercial muriatic acid, which is relatively inexpensive and which usually forms salts more readily soluble than those of nitric, sulfuric and other acids. In the case of old wells in which the rate of flow has declined materially from its initial rate of flow, it has likewise become a general practice to clean the well of paraffin, asphalt, and similar soluble substances and sediment, in various ways, and to then "acidize" the well. The methods used to remove paraffin and other accumulated impurities and sediments have included mechanical means such as scraping, melting of the substance by hot steam or hot inert gases, and particularly by the use of various liquids which dissolve the substance as paraffin or asphalt or otherwise change their characteristics and render them removable.

In "acidizing" an old well, particularly one previously acidized, more acid usually has been used than would be used in a new well, because in the old well various channels have been formed and the acid must be forced to a greater distance from the bore in order to be effective and to reach new areas. Likewise, in a new well cleaning may be unnecessary, or need not be so long extended as in an old well. In general, however, the "acidizing" of a well has been carried out in the same manner whether it is an old well or a new well, and in any case the well must be clean, or reasonably clean, if the "acidizing" is to be effective.

One of the objects of the present invention is to provide a method of treating a well which will accelerate the action of the liquid substances heretofore used in treating oil and gas wells, whether used for cleaning or acidizing the well or both, and which will thereby reduce the time required for the treatment.

A further object is to provide such a method which will increase the effectiveness of such liquids not only so as to reduce the quantity required, and to increase the distance from the well bore to which it can be forced, and hence increase the volume of the producing formation that will be subjected to treatment, but also to render it effective against substances which otherwise would not be affected thereby.

Still further objects of the invention are to provide such a method which can be carried out economically, which will render further treatment of a well unnecessary for a maximum period of time, and which can be carried out to effect both the cleaning and the acidizing of a well with a minimum of equipment.

Yet another object of the invention includes the provision of a structure and method which will increase the effectiveness of such liquids by jetting them into the well bore formations to be treated thereby obaining greater penetrating effect and assuring the opening up of spaces outwardly of the well bore which may contain well fluids to be produced.

An additional object of the invention includes the provision of a structure and method which will increase the effectiveness of such liquids by jetting them into the formation from a series of vertically spaced apart nozzles whereby selectivity of penetration points is obtainable.

Still another object of the invention includes the provision of a structure and method which permits selectivity of penetration points by means of varying the pressure of the liquid supplied to the nozzles.

It is also an object of this invention to provide a structure and method of this class employable to pre-heat the producing formation, as to dissolve paraffin, asphalt and solubles that have adhered to the well bore wall such structure also being employable in a method of pre-heating the bottom of the well bore to assure a more effective treatment of the producing formation.

It is yet another object of this invention to provide a structure and method of this class employable to pressurize the well bore prior to the employment of acid, as by jetting hot air through the nozzles to drive any fluid in the well bore back into the formation.

It is also a further object of this invention to provide a structure and method employable to seal off a porous or "open" well bore section prior to subsequent treatment by injecting a chemical, as sodium silicate, into such porous or "open" section and following it up by injecting atomized hydrochloric acid or the like to react with the first chemical to form a sealing jel whereby formations spaced from the sealed portion may be pressurized without producing flow through the gel.

Further objects of the invention, and the manner of carrying out the process, as well as the novel effects resulting therefrom, will be apparent from the following specification when read with reference to the accompanying drawing, in which:

Figure 1 is a diagrammatic illustration of a typical oil well installation with suitable apparatus connected thereto for carrying out the process of my invention, showing diagrammatically one effect of such process upon the producing formation;

Fig. 2 is a diagrammatic view, similar to a part of Fig. 1, showing the effect of the processes heretofore used;

Fig. 3–A is a view, part in section, of the upper part of the jet tube employed in the practice of the invention;

Fig. 3-B is a view, part in section, of the lower part of the jet tube; and

Fig. 4 is a sectional view through one of the jet nozzles employed on the jet tube.

In the treatment of oil or gas wells to augment their flow, in accordance with my invention, the liquids used are those which are indicated by experience in treating wells in the same or like formations, or those which laboratory tests upon samples from the producing formation indicate would be effective to produce the solvent or chemical action desired. Many such liquids have been used advantageously in well treatment, and for the purposes of this specification, I have adopted and use the term "treatment liquid" to indicate any substance or solution or mixture thereof which is liquid under normal temperatures at atmospheric pressure and capable of dissolving a soluble substance as paraffin or asphalt, such as carbon tetrachloride or hydrocarbon compounds and mixtures thereof such as benzine, naphtha, or casinghead gasoline, and likewise to mean any substance or solution or mixture of substances which is liquid under normal temperatures at atmospheric pressure and capable of reacting chemically with any constituent of the producing formation to form reaction products which may be removed from the well.

Generally stated, my invention comprises the treatment of a well by preheating the producing formation adjacent the well bore, applying a pressure sufficiently in excess of the rock pressure to force the fluid from the bottom of the well bore back into the producing formation away from the well bore and, while maintaining such pressure, introducing into the top of the well a hot compressed gaseous medium containing the treatment liquid in the form of vapor, the temperature of such gaseous medium and the face of the producing formation, as well as the parts with which it contacts on the way thereto, being maintained in excess of the temperature of condensation of the treatment liquid at the existing pressure.

In acidizing a well, it is essential that the bottom of the well bore be clean, so that the acid can reach the producing formation, and to prevent the generation by the action of the acid upon the sediment and other substances, of a gelatinous mass or muck which is extremely difficult to remove and greatly retards the flow. While the process of acidizing in accordance with my invention can be applied to wells cleaned by other methods, or to such new wells as do not require cleaning, the cleaning and the acidizing in accordance with my invention are carried out generally in the same manner, by the same apparatus, and preferably as a series of consecutive and similar steps, and if a well is to be acidized by my process many advantages are secured by also effecting the cleaning by my process. Among such advantages, for instance, are the fact that the cleaning by my process heats the well bore in the producing formation and the metal parts of the well, thereby rendering unnecessary the preheating which would be required if the well had been cleaned by other means, the fact that no changes need be made in the equipment, and the great saving in time brought about.

Under the methods of acidation heretofore used, the amount of acid varies greatly, and the amount used is largely a matter of judgment, based upon consideration of the results obtained in adjacent or similar wells, laboratory tests upon samples of the formation, the depth of the well, the thickness of the formation, and the results it is desired to obtain. When muriatic acid has been used it has generally been diluted with about an equal quantity of water, to form a 15 percent, or weaker, solution, and the amount of such solution used has varied from 500 gallons to 20,000 gallons. In general, in carrying out my invention, I prefer to use commercial muriatic acid without dilution, and have found that about one half as much acid, that is, one fourth as many gallons as would be indicated for any particular well according to the previous methods, gives a much improved result.

The atomized treatment fluid is introduced by my method through a series of jet nozzles which are vertically spaced apart in a sectionalized jet tube installed on the lower end of the tubing string and thus the advantages of the force of jetting is obtainable at selective vertical intervals. Also, the jet tube has valves between sections with successively lower valves set to open at successively higher pressures so that vertical selectivity of penetration is also obtained by bringing successively lower sections of the jet tube into action as the pressure of the atomized fluid is increased.

For carrying out the process of my invention in both cleaning and acidizing an old well of average type, typical apparatus would be used, such as is shown in the accompanying drawings. As shown therein, the casing 11 is provided with a casing head 12, in which tubing 13 is secured. Laterally extending pipes 14 and 15 are connected to the tubing, and similar pipes 16 and 17 are connected to the casing head, each fitted with a valve, 18, 19, 20 and 21, respectively, pipe 14 being connected to pipe 16, and pipe 15 being connected to pipe 17, respectively, beyond the valves, preferably through T-joints having bull plugs 22 and 23 therein, respectively, which installation is usual, and commonly known as a "Christmas tree" connection. A choke valve 24 is usually provided in the tubing 13, and a pressure indicator 25 is suitably connected to the tubing. The pipe 17 having gauge 17' connected thereto is connected to separator 26, as shown, or to storage tanks, as desired. All of such installation is that usually used in a producing well.

The added equipment used in preferably carried on a truck, so as to be readily portable, and comprises a power means 27 driving a compressor 28, from which flow line 29 leads through a meter 30, a reservoir tank 31, to absorb pulsations, equipped with a pressure indicator 32, and through a valve 33 to a heater 34. To the flow line 29, between the tank 31 and the valve 33, there is connected a pipe 35 which is branched to connect to the tops of water tank 36 and "treatment liquid" tank 37, through valves 38 and 39, respectively. The tanks are equipped with pressure indicators 40 and 41, respectively. An atomizer 44 is connected in the flow line 29 between the valve 33 and the heater 34, to atomize into the flow line either water or treatment liquid, as desired, such atomizer being fed through a pipe 45 which is branched and connected through valves 46 and 47 to the bottoms of tanks 36 and 37, respectively. The heater 34 may be of any suitable construction and is connected by pipe 48 through a thermometer 49 to pipes 14 and 16, so as to feed to the tubing or casing or both, as desired.

At the lower end of the tubing 13 a jet tube assembly 50 is installed as shown in Fig. 1. As shown in detail in Figs. 3-A and 3-B a jet tube 51 is connected by means of a nipple 52 to the bottom of the tubing 13 and a strainer 53 is installed at this point to strain the fluid in the in passage between tubing bore and jet tube bore. Below the strainer 53 a top valve unit 54 is connected to the jet tube and such unit includes an upper plate 55 which provides a valve seat 56 therein and a lower plate or spider 57 which has a central bore 58 therein to receive press fitted thereinto a guide stem 59 on which a valve head 60 is slidable and seatable upon the valve seat 56 as urged thereagainst by a spring 61 as the guide stem head 59' is received in a recess in the valve head. The spring 61 extends around the stem 59 and seats on the lower plate or spider 57.

Below the top valve unit 54 jet nozzles 62 are installed, and a satisfactory method of installation comprises installing diametrically opposed jet nozzles 62 at one elevation on the jet tube 51 and spaced therebelow and 90° therefrom installing another diametrically opposed pair of jet nozzles 62, and continuing such pair installations at successively lower locations with alternate pairs 90° apart in radial position.

Fig. 4 shows a preferred jet nozzle construction in detail, such jet nozzle 62 including an inner member 63 threaded at 64 to be received in threaded radial bores provided in the jet tube 51, and internally threaded at 65 to receive threaded inner end 66 of an outer or jet member 67. A suitable core 68 is provided to break up the outward flow of fluid through the outer member and deflect it and such core may preferably be of the construction shown in Patent No. 2,305,210 for Spray Shaper issued December 15, 1942, to F. W. Wahlin and assigned to Spraying Systems Co., of Chicago, Illinois. Such spray shaper is adapted to swirl and deflect the fluid ejected through the reduced diameter outlet 69 so that it is delivered or jetted therefrom in the form of a conical pattern.

Each section 70 of the jet tube 51 has a plurality of spaced apart pairs of jet nozzles 62 therein and the successive vertically aligned sections are divided by valve units 54, with a cap or plug 71 being provided to close the lowermost section.

As constructed the jet nozzles 62 extend outwardly from the jet tube 51 and in order to protect these nozzles from being brought into contact with the well casing 11 or with any hard external formation or object likely to knock them off a tubular shield 72 which has a swedged upper member 73 thereon adapting it for connection to the tubing string 13. Radially outwardly of each nozzle outlet 72 an opening 73 is provided in the shield 72 of sufficient diameter to permit the ejected cone of fluid to pass therethrough without interference.

The well bore wall below the casing, designated by 75 may or may not originally have therein cracks or cleavage surfaces 76 through which formation fluids as oil may flow from pockets 77. Thus with methods heretofore employed, as those shown in Patent No. 2,265,923 for Process of Treating Oil and Gas Wells to Increase Production, issued December 9, 1941, to this applicant, the treatment fluid employed, although in vaporized state, had to be injected at relatively high pressures to insure penetration, and it could be estimated that a percentage of pockets were not opened up by the pressurized, heated, atomized fluid. However, by the employment of jet nozzles to eject the fluid forcefully, pockets as those encountered in many porous limestone formations can be penetrated as the jetted fluid wears away the intervening formation so that there results a substantial and unexpectedly increased opening up of production by employment of the jet tube 51.

The opening of the successively lower valves 60 at successively increased pressures can be assured by providing springs 61 of different tensions, with the uppermost spring tested to open at one desired pre-determined pressure and with successively lower springs tested to open at pre-determined successively higher pressures. Optionally the guide stem 59 may be of enlarged diameter and threaded adjacent the valve 60 and a nut installed on this enlarged threaded section to bear downwardly upon a washer which bears against the top of the spring 61. Thus by threading the nut along the enlarged diameter threaded portion of the guide stem 59 the tension of the spring 61 may be adjustably varied.

In the case of a well equipped for pumping, the pumping equipment is removed from position to permit free access from the tubing to the bottom of the well. In any case, proper connection is made so that, when the valves 18, 19, 20 and 21 are closed, the top of both the casing and the tubing will be closed in, and so that the flow line may be connected to the tubing or casing as desired. I prefer to apply the heating medium and the vapors of treatment liquid through the tubing, rather than through the casing, thereby minimizing the loss of heat.

In case it is desired to circulate down the casing 11 with return flow passing up the tubing 13 it is only necessary to reverse the installation of the valve units 54 in the jet tube 51 so that valves open upwardly instead of downwardly, the setting of the lowermost valve being selected to open at the lowest pressure with the successively higher valves being set to open at successively higher pressures. In this arrangement the plug 71 would be omitted and the bottom of the jet tube 51 left open, with the lowermost valve unit 54 being located immediately above such bottom opening. In this installation the assembly should be such that the vertical spacing of the jet nozzles 62 should be aligned with the openings 73 in the shield 72 to properly discharge therethrough as the valves higher and higher up the jet tube assembly open as the pressure builds higher and higher.

As a preliminary step, the producing formation adjacent the bottom of the well bore is heated by circulating into the tubing, through valve 18, to the jet tube 51 when such has been positioned at substantially the bottom of the well and then back up through the casing, about the tubing, and through valve 21 to atmosphere, a gaseous heating medium at the rate of about 10,000 cu. ft. an hour, and at a temperature of, or exceeding, 250° F. The gas not only contacts with the face of the producing formation but bubbles up through, and heats and agitates, the fluid which generally is present in the bottom of the well, and through the fluid in the casing if there is any present therein, and tends both to melt paraffin or asphalt and the like to cause it to be again dissolved in the oil. This circulation is continued for about an hour under normal conditions, but would be maintained for a much longer period if the well is deeper than average, or if it is believed that the paraffin or similar deposits are particularly heavy. When the temperature of the gas escaping at the top of the casing has reached approximately the temperature of that initially entering the top of the tubing, and when likewise sufficient time has elapsed to warrant the conclusion that the metal parts of the well and the face of the producing formation have been cleaned, and that the paraffin and similar substances have been melted or dissolved, the preheating period is considered to be complete, and valve 21 is closed. The gas used as a heating medium is preferably natural gas, but in many localities natural gas is not available and air has been used frequently and satisfactorily, it being usually advisable to use a slightly greater quantity of air than of natural gas.

With only valve 18 open, the flow of the compressed gaseous heating medium is continued, to build up the pressure in the entire well to a point exceeding the rock pressure of the producing formation, in order to drive all of the fluid out of the bore at the bottom of the well and back into the producing formation. It will be appreciated that, under some conditions in which the oil level is at a considerable distance above the bottom of the casing, the pressure thus applied through the tubing will blow upwardly and will substantially hold suspended between the tubing and casing a column fluid as of oil because of its position in the casing annulus between tubing and casing such column will not be forced back into the formation surrounding the open well bore therebelow, but rather all of the open fluid that is in the bore will be forced therefrom back into producing formation. During this period the pressure rises gradually and finally becomes practically stationary, at a pressure which is balanced by a pressure equal to the rock pressure of the well plus the pressure necessary to force the fluid through the pores of the formation. Of course, it will be realized that with some producing formations, such as "gravel wash" formations or cavernous formations, it is impossible to build up any material pressure, in which case determination of how long to continue the attempt to do so is merely a matter of judgment.

When the indicator 25 no longer shows a rise of pressure, carbon tetrachloride, casinghead gasoline, naphtha, benzine, kerosene, gas oil, or any other treatment liquid capable of dissolving such as paraffin or asphalt, depending upon the existing conditions and needs, is atomized into flow line 29, being forced into the jet in the atomizer 44 through pipe 45, by opening valve 47. It will be appreciated that the surface of the liquid in tanks 36 or 37 will have been subjected to a high pressure. For instance, after loading, a pressure, usually about 500 pounds per square inch, is applied by closing valve 33 and opening valve 38 or 39, respectively. It will likewise be understood that if casinghead gasoline, or similar liquids, are to be used in large quantity, they may be pumped into tank inlet 43 at whatever pressure is necessary, above that temporarily existing in the flow line, to effect atomization.

Usually, the rate of atomization is about 100 gallons of liquid atomized into about 10,000 cubic feet of gas per hour. The rate at which the treatment liquid is atomized may be much higher when the operator is warranted in believing that it is readily permeating the formation, but, in general, it is believed that more thorough and more extended cleaning is effected by a given amount of treatment liquid if it is applied slowly during a more extended period, provided, of course, that the rate is always high enough to insure proper heating of the face of the formation.

The amount of treatment liquid used for permeating and cleaning the formation, as well as the length of the period during which it is applied, varies greatly with the conditions encountered; for instance, 50 gallons of casinghead gasoline applied in an hour may be sufficient to obtain the results expected in a producing formation of sandy lime only 5 feet thick, the well being only 330 feet deep. On the other hand, in a badly clogged well 3200 feet deep in a producing formation of hard sandy lime 70 feet thick, 250 gallons of casing-head gasoline may have to be applied in 5 hours, and such treatment may be effective whereas 150 gallons may be insufficient to remove the paraffin and similar substances.

By the time the well has been thus preheated, and thus cleaned in a manner which further heats it under pressure, as described, the cleaning vapor has been jetted into the formation to a considerable distance from the bottom of the well bore, thereby both increasing the porosity and permeability of such portion of the formation, and heating a material volume of the formation, so that, for a considerable distance from the bore, the particles of the formation will be at the temperature of condensation of the liquid used, or a higher temperature.

After the desired amount of cleaning liquid has been applied, the acid treatment is begun, by placing in the tank 37 a charge of acid as desired, and applying to the surface thereof a pressure, usually about 500 pounds per square inch, but in any case materially greater than the pressure in the flow line, as described heretofore, and then again opening the valve 47. It will be understood that, in the interim, which usually is only a few minutes, the flow of the gaseous medium is continued without any reduction of pressure.

The acid as hereinabove described such as for instance hydrochloric acid in the form of commercial muriatic acid is, in most cases, preferably applied in charges or increments, usually four, the number being much greater if an unusually large quantity of acid is to be used. The periods during which such charges are applied are alternated with periods, usually of about the same duration, during which the flow of the hot compressed gaseous medium is continued. At the beginning of, or sometimes throughout each of, such intermediate periods it has been in most cases my practice to atomize into the compressed gaseous medium a charge of water from tank 36, by opening valve 46, in order to "wash" the inside of the tubing by dissolving and decreasing the corrosive effect of, the acid vapor thereon, and to provide a medium for dissolving the calcium chloride and other products of reaction. Such periods of introducing acid and periods of introducing the compressed gaseous heating medium are continued alternately until the desired amount of acid has been applied.

As an optional way of applying the acid treatment, a pump 80 of capacity and construction to deliver the acid at high pressure, and commonly termed a triplex pump, may be provided in a line 81 extending from the treatment liquid tank 37 to the line 29, such line having suitable valves 82, 83, 84 therein. Then with the valves 38, 39, and 33 closed, and the valves 82, 84, and if need be 83 open, the pump 80 is started to accomplish atomization or spraying of the treatment liquid into the pressure line 29 at the atomizer 44.

At the beginning of each period of applying an acid charge, the pressure usually declines rapidly, sometimes to zero, which is an indication that the action of the acid upon the formation has opened up the pores thereof and permitted expansion into a greater volume of the formation.

After the desired acid charge has been introduced, the flow of the heated compressed gaseous medium is continued without interruption to force the acid vapor farther back into the formation and heat such extended horizons of the formation in preparation for another acid charge. During such alternate period, as the acid becomes spent, the pressure usually rises slowly, but it is not necessary, and in fact it is in some cases impossible within a reasonable time, to build the pressure up to that existing when the acid was first introduced.

Under most condition, I have made the intermittent periods of about the same duration as the periods of introducing acid, but they may be shortened if the well is not deep, or if there is evidence that the well is not in need of more heating before the next acid charge, or if the pressure rather rapidly approaches that at the start of the acid treatment. The primary purpose of such intermittent gaseous treatments is both to force farther from the bottom of the well bore the acid vapor, or particles of acid vapor which have condensed within the formation but are not entirely spent, and to heat the formation as far as possible from the well bore to a temperature above the point of condensation of the acid vapor. A further purpose as stated heretofore, is to afford a means of conveying water in the form of steam to the inner surface of the tubing to lessen the corrosive action of the acid thereon, and to insure that salts resulting from the action of the acid will be dissolved.

After the final charge of acid has been introduced, the introduction of the heated, compressed gaseous medium is continued for the same purposes as described with reference to the intermediate periods, but as a rule the application period, after the final acid charge, is greatly extended, in order to build up the pressure, if possible, to at least the pressure that had been attained before the acid was applied. In any case, the period would be extended long enough to insure that the acid has become spent. The purpose of this period of application of gas under pressure is to insure that when at the end of such period, the pressure is suddenly released, the gaseous particles moving from the remote portions of the producing formation into the bottom of the well bore will carry along with them particles of water containing reaction products in solution therein, and particles of oil, paraffin or sand, and similar bodies. To obtain this flushing action is it of course desirable that the pressure be as high as possible from the bore and will be as violent as possible to remove as many particles as possible and increase the tendency to form open channels in the formation and leading to the bore, and it is of course preferable that none of the acid be wasted by allowing it to escape prematurely. This final period usually is extended for two hours or more.

The pressure is then suddenly released by closing valve 18, and opening valve 19, or both valve 19 and valve 21. It will be appreciated that, in the case of a "flowing well," it would be preferable to open only valve 19, while in the case of a "pumping well," that is, one that it has been necessary to pump, it sometimes may be desirable to open valves 19 and 21, in order to release the pressure in both the tubing and the casing as suddenly as possible. The gases blown off escape and any liquid mixture of oil, salt water, etc., is run into the slush pit until the well has purged itself and the flow is suitable for use. Likewise, in the case of a pumping well, the undesirable liquid mixture is pumped out and discarded, or if desired, such undesirable mixture may be removed by bailing or swabbing, or similar means.

In case the well is merely preheated and then cleaned, the acidizing treatment being considered unnecessary or undesirable for any reason, the steps for cleaning are carried out exactly as hereinbefore described, and the well is placed "back in production" as above described, except that in such case it is usually preferable that the well be closed in and kept sealed until the pressure is substantially normal before placing the well "back in production." If this reduction of pressure to normal does not occur in a reasonable length of time, the pressure should be released and the well placed "in production."

An important distinction between applying to a well any treatment liquid in vapor form, as distinguished from application in liquid form is that, under the pressure applied, the vapor is uniformly distributed throughout the entire depth of the formation at the bottom of the well and attacks the wall uniformly regardless of the size and shape of the opening that may exist, so that the effect will tend to be that shown in Fig. 1. On the other hand, if the treatment liquid is dumped into the well in liquid form, and pressure is applied to the liquid, such pressure tends to force the liquid away from the bore near the bottom of the formation because of the greater pressure there, and because if the liquid can there enter the formation all of it may be fed into such part of the formation and never reach the higher portions of the formation. If the well has had a previous acidizing treatment, and as a result of such treatment, or for any other reason, there exists an opening of considerable size at the bottom of the well, such as shown in Fig. 1, it will be quite evident that a liquid acid charge of less volume than such opening could not possibly reach the upper parts of the formation, while a charge applied in vapor form would reach all of the surface of such an opening regardless of its size, and would attack all of such surface uniformly.

It will be understood that, while it is preferable to atomize the treatment liquid into the flowing stream of compressed gaseous medium and heat the mixture, such exact arrangement of the parts is not essential and that the compressed gaseous medium may be passed through the heater and the treatment liquid then atomized into the stream of heated compressed gaseous medium. Likewise, while it is distinctly preferable, for the reasons stated, to treat the well through the tubing, rather than through the casing, it will be understood that in shallow wells it would be possible to apply the treatment through the casing, particularly when the pressure necessary is low and when conditions are such that the loss of heat through the casing could be overcome.

It will be apparent that by the application of any treatment liquid as herein described, so that it is jetted into the preheated formation in vapor form, its effectiveness will be greatly enhanced over that of the same substance in liquid form, not only because it can be forced farther into the formation, by the same pressure, than a liquid could be forced, thus greatly increasing the volume of the formation which would be rendered permeable and porous, but also because such treatment liquids, upon increase of temperature, attack the same substances more actively and also attack substances which they would not attack at a lower temperature, and also because their action is more rapid and effective when in vapor form than when in liquid form.

A great advantage not heretofore obtainable can be accomplished by this invention in the nature of selectivity of penetration levels. The jet nozzles 62 are spaced apart on the jet tube 51 but sufficiently close together that the jetted cones of vapor can substantially cover the well bore wall below the casing. However since successively lower sections 70 can be brought into play as the pressure in the tubing 11 is increased, a pressure may be employed to open only part of the valves 60, as the uppermost valve for instance, and thus only the jet nozzles in the section 70 immediately below this uppermost valve 60 may be brought into play. This limited vertical distance of operation may be maintained by raising or lowering the tubing, or the range of operative vertical distance may be increased by leaving the tubing in its original position at the bottom of the well and increasing the pressure in the tubing to open up the next section below, and further increased to open up still lower sections.

To insure that a greater pressure is maintained in the tubing than in the casing or well bore so that the jet nozzles may operate effectively a balance should be effected between the capacity of the compressor 28 and the total delivery capacity of all of the jet nozzles 62. For instance if a compressor 28 having capacity to deliver 300 cubic feet of fluid per minute at a maximum pressure of 500 p. s. i. is used, the jet nozzles all told should have a capacity to deliver approximately 60% of the compressor capacity or 180 to 200 cubic feet of fluid per minute.

In formations having very porous areas it is often desirable to seal off such areas before treating other areas thereof. To this end the jet tube 51 can be positioned and operated at pressures to jet into such very porous areas first a gel base chemical, as sodium silicate, and thereafter an acid which will react with the chemical to form a gel may be jetted into such very porous or "open" areas, as for instance hydrochloric acid. The gel thus formed will seal off the very porous or "open" areas against the flow of fluid therethrough to be lost in outward cavities, and thereafter the less porous areas may be treated as hereinabove described.

Broadly this invention encompasses a process and structure for treating oil and gas wells to increase production by jetting heated, vaporized fluid into the producing formation surrounding the well bore, and it also includes the pre-heating and cleaning steps preparatory thereto fore, as well as the steps hereinabove described for sealing off very porous areas. Methods and sequences of steps and variations of structure are consequently considered other than specifically described hereinabove and shown in the drawings, as such methods, sequences, and structures may fall within the broad spirit of the invention and within the broad scope of interpretation claimed and merited for the appended claims.

What is claimed is:

1. For employment in a well bore having a tubing suspended therein, a jet tube including a tubular member connectable upwardly to the lower end of said tubing and having a closed lower end, vertically spaced apart jet nozzles in said jet tube and extending therefrom, spaced apart valves dividing said jet tube into a plurality of valve segregated sections and set from top to bottom to open at successively higher pressures, and a shield around said jet tube outwardly of said jet nozzles and providing openings adjacent said jet nozzles through which said jet nozzles may discharge a pressurized fluid delivered down said tubing to build up pressure in excess of well bore pressure and to open said valves successively from top to bottom.

2. For employment in a well bore having a tubing suspended therein, a jet tube including a tubular member connectable upwardly to the lower end of said tubing and having a closed lower end, vertically spaced apart jet nozzles in said jet tube through which said gas may be discharged and set from top to bottom to open at successively higher pressures, and a shield around said jet tube outwardly of said jet nozzles through which the jet nozzle discharge may pass outwardly a pressurized fluid delivered down said tubing to build up pressure in excess of well bore pressure and to open said valves successively from top to bottom.

3. For employment in a well bore having a tubing suspended therein, a jet tube including a tubular member connectable upwardly to the lower end of said tubing and having a closed lower end, and vertically spaced apart jet nozzles in said jet tube through which said gas may be discharged a pressurized fluid delivered down said tubing to build up pressure in excess of well bore pressure and to open said valves successively from top to bottom.

4. For employment in a well bore having a tubing suspended therein, a jet tube including a tubular member connectable upwardly to the lower end of said tubing and having a closed lower end, vertically spaced jet nozzles in said jet tube and extending therefrom, and spaced apart valves dividing said jet tube into a plurality of valve segregated sections and set from top to bottom to open at successively higher pressures responsive to the pressure of a fluid delivered down said tubing to build up pressure in excess of well bore pressure and to open said valves successively from top to bottom.

5. A jet tube comprising a tubular member adapted at its upper end for connection to a tubing, vertically spaced apart jet nozzles in said jet tube, transverse partitions dividing said tubular member into a plurality of jet nozzle containing sections and each partition providing a valve seat therein, resiliently urged valves normally urged to close said partitions and set from top to bottom to open at successively higher pressures, and a shield surrounding said tubular member and providing openings adjacent said nozzles through which the jet nozzle discharge may pass.

6. In combination with a well having a tubing therein and encasing an annular space outwardly of said tubing, a compressor and atomizer at the top of the well and adapted to supply a reagent into said tubing in the form of a heated gas at pressure exceeding the pressure of the formation surrounding the well bore, a jet tube including a tubular member connectable to said tubing, vertically spaced jet nozzles in said jet tube and extending therefrom, and spaced apart valves dividing said jet tube into a plurality of valve segregated sections and set from bottom to top to open at successively higher pressures.

7. For employment in a well bore having a tubing suspended therein, a jet tube including a tubular member connectable upwardly to the lower end of said tubing, vertically spaced jet nozzles in said jet tube and extending therefrom, and spaced apart valves dividing said jet tube into a plurality of valve segregated sections and set from an open end of said tubular member with the valves successively spaced therefrom opening at successively higher pressures responsive to pressurized fluid entering said open end to open said valves successively and to dicharge therefrom at pressures in excess of fluid pressure adjacently in the well bore.

8. A jet tube comprising a tubular member adapted at its upper end for connection to a tubing, vertically spaced apart jet nozzles in said jet tube, spaced apart valves dividing said jet tube into a plurality of valve segregated jet nozzle containing sections and set from top to bottom to open at successively higher pressures.

9. A jet tube comprising a tubular member adapted at its upper end for connection to a tubing and having an open lower end, vertically spaced apart jet nozzles in said jet tube, spaced apart valves dividing said jet tube into a plurality of valve segregated jet nozzle containing sections and set from bottom to top to open at successively higher pressures.

10. A jet tube comprising a tubular member adapted at its upper end for connection to a tubing, vertically spaced apart jet nozzles in said jet tube, spaced apart valves dividing said jet tube into a plurality of valve segregated jet nozzle containing sections and set from an open end of said tubular member with the values successively spaced therefrom opening at successively higher pressures responsive to pressurized fluid entering said open end and to open said valves successively and to discharge therefrom at pressures in excess of fluid pressure adjacently in the well bore.

11. For employment in a well bore having a tubing suspended therein, a jet tube including a tubular member connectable upwardly to the lower end of said tubing and having an open lower end, vertically spaced jet nozzles in said jet tube and extending therefrom, and spaced apart valves dividing said jet tube into a plurality of valve segregated sections and set from bottom to top with the valves successively spaced from the bottom opening at successively higher pressures responsive to the pressure of a fluid delivered down said well bore to build up pressure in excess of well bore pressure and to open said valves successively from top to bottom.

References Cited in the file of this patent

UNITED STATES PATENTS

| | | |
|---|---|---|
| 968,851 | Illy | Aug. 30, 1910 |
| 1,524,592 | Stephens | Jan. 27, 1925 |
| 1,768,984 | Husted | July 1, 1930 |
| 1,790,924 | Johnson | Feb. 3, 1931 |
| 2,221,261 | Lehnhard | Nov. 12, 1940 |
| 2,233,271 | Staudt | Feb. 25, 1941 |
| 2,237,313 | Prutton | Apr. 8, 1941 |
| 2,265,923 | Normand | Dec. 9, 1941 |
| 2,300,348 | Dana | Oct. 27, 1942 |
| 2,327,051 | Lyons et al. | Aug. 17, 1943 |
| 2,675,083 | Bond | Apr. 13, 1954 |